United States Patent Office 3,298,551
Patented Jan. 17, 1967

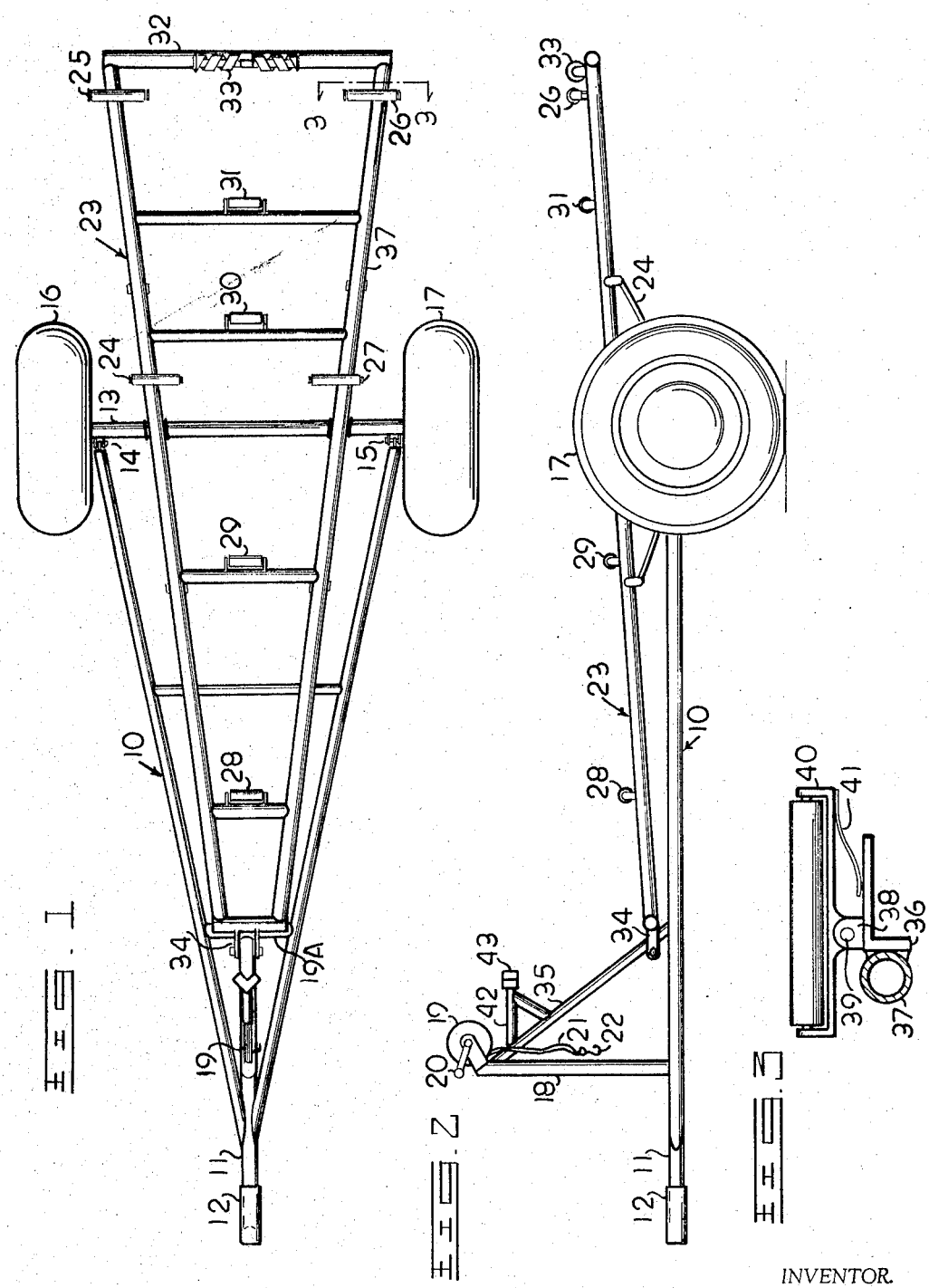

3,298,551
BOAT TRAILER
Warren H. Thompson, San Diego, Calif.
(P.O. Box 59, Encinitas, Calif. 92024)
Filed Nov. 23, 1964, Ser. No. 413,124
1 Claim. (Cl. 214—506)

My invention generally relates to a boat trailer and more particularly to a boat trailer that is operated solely by one person.

An object of my invention is to provide a device of simple, low cost manufacture, for transporting a boat, that only requires one person to load and unload or launch such boat.

Another object is to provide a device described for transporting a boat that does not require the wheels to be in the water during loading or launching, nor is it necessary that the fee of the operator ranch the water.

These together with other objects and advantages which will become apparent reside in the details of construction and operation as will be more fully described and claimed, reference being made to the accompanying drawing forming a part hereof, wherein like numerals refer to like parts throughout, and in which:

FIGURE 1, is a top plan view of my invention.

FIGURE 2, is a side elevational view.

FIGURE 3, is an elevational view of one of the side rollers taken at approximately 3—3 of FIGURE 1.

Referring specifically to the drawing, there is provided a triangular shaped tubular frame 10, FIGURES 1 and 2, having a tongue 11 and hitch means 12 for towing behind a vehicle.

At the rear of the triangular shaped tubular frame is pivotally attached, an axle 13, by clevis means 14 and 15.

The axle 13 is provided with bearinged wheels and automobile type pneumatic tires 16 and 17. Suitable cross braces 18 and 19 are welded to maintain rigid alignment of the triangular frame 10.

At the forward end of triangular frame 10 is welded an upright triangular tubular frame 18 having a ratchet type winch pulley 19, with hand crank 20 and rope or line 21 with a suitable hook 22 secured at the end, FIGURE 2.

Above the triangular frame 10 is mounted the boat bearing frame, designated frame 23, this consists of a generally triangular shape of tubular metal, with plurality of cross members preferable welded to form a ladder like frame. This frame 23 is mounted by the two leaf type springs, one shown in elevational view 24, FIGURE 2. The one on the opposite side not shown.

This frame 23 having side rollers 24, 26 and 27, detail FIGURE 3, center keel roller 28, 29, 30 and 31 welded to the cross members. The rear cross piece 32 is provided with a keel centering roller 33, but no invention is claimed in this device. Likewise no invention is claimed in the ratchet type winch pulley 19, nor in the hitch means 12.

A clevis 34, FIGURES 1 and 2, is provided for securing the frame 23 at the forward end of the device. This secured to the angular brace 35 by straddling of the clevis and bolting.

The four side rollers 24, 25, 26 and 27 are shown in more detail in FIGURE 3 and described as follows: Angle 36 is welded to the tubular member 37 and a bracket 38 is welded to angle 36 and pivotally secured by shaft 39. It will be noted that the roller bracket 40 is mounted off center and supported by leaf spring 41 welded at the bottom of the roller bracket 40, but is free to flex and move along the top of angle 36.

A bow bumper means 42 is mounted on the angular brace 35 and contains a V block 43 to receive the boat's bow forward edge.

In operation:

In the launching operation from water's edge, only one operator is required. The trailer is backed to the water's edge so that the wheels are at but not in the water.

The bolt of the clevis 23 is removed and the hook 22 of winch 19 is hooked into the clevis and the front of triangular frame 23 is caused to be tilted up, with the boat thereon by the rotation of the winch ratchet means 19.

The hook 22 is then changed from the cleivs to an eyelet provided on the bow of the boat and the line 21 is payed out to allow the boat to move by gravity along the center rollers 28, 29, 30, 31 and 33, and also by side rollers 24, 25, 26 and 27 into the water. Thus the boat is launched.

To load a boat on the invention a reversal of the operation, just described, is as follows. The trailer is backed to the water's edge with the bolt of clevis 34 removed and the tubular frame 23 tilted back at the axle clevises 14 and 15. The line 21 is payed out and hook 22 is inserted into an eyelet, provided, at the bow of the boat. The winch is cranked to wind the line 21 and thus draw the boat onto the trailer. When the boat is in place with the bow in the V block 43 the forward end of the tubular frame 23 is tilted downward and the bolt of clevis 34 is inserted therein.

In describing the operation and function of the side rollers 24, 25, 26 and 27 illustrated, top view FIGURE 1 and in detail FIGURE 3.

The angles of the side areas of boats vary somewhat and therefore it is desirous that a self centering system of rollers are positioned in these areas.

It will be noted that the roller bracket 40 is pivotally mounted off center so that gravity causes it to tilt to the right, as in the case of detail of FIGURE 3. This tilting direction as shown would apply to rollers 26 and 27 and the reverse for rollers 24 and 25. If the surface of the boat is such as to require a tilting of the roller to the right or left the device will automatically conform to that surface.

It will be clear that the embodiment of the invention may be used in many ways as well as changed. Such changes will not effect the essence of the invention as described in the annexed claim.

Having illustrated and described my invention what I claim as new is as follows:

A boat trailer comprising:
in combination, a generally triangular frame having a ball socket type hitch at the forward end and a set of wheels;
an axle pivotally attached by clevis means at the rear end, said axle having another generally triangular frame secured above and connected to it by means of two sets of leaf type springs opposite each other to absorb shock, said upper triangular frame having a means of temporarily attaching its forward end to the lower frame, said lower frame having a winch and line means of drawing a boat on the upper frame for transporting, said upper triangular frame having a plurality of center rollers mounted on its cross braces and a system of rollers for bearing the sides of a boat; and said system of boat side bearing rollers comprising a system of roller bearing brackets generally V shaped having the said rollers rotatably mounted by a horizontal shaft at each end and said roller bearing brackets pivotally mounted to a bracket below and off center of its center of gravity and having the normally dropping side supported by a singular leaf type spring secured to the said roller brackets below and free to deflect downward for adjustment in aligned contact.

References Cited by the Examiner

UNITED STATES PATENTS

| | | | |
|---|---|---|---|
| 2,808,953 | 10/1957 | Whitney | 214—505 |
| 2,933,328 | 4/1960 | McIntyre et al. | 214—84 X |
| 3,035,723 | 5/1962 | Brosch | 214—505 X |
| 3,057,493 | 10/1962 | Cameron | 214—505 X |

GERALD M. FORLENZA, *Primary Examiner.*

ALBERT J. MAKAY, *Examiner.*